(12) United States Patent
Teiken

(10) Patent No.: US 8,470,088 B2
(45) Date of Patent: Jun. 25, 2013

(54) CAST BODIES, CASTABLE COMPOSITIONS, AND METHODS FOR THEIR PRODUCTION

(75) Inventor: Justin Teiken, Bowling Green, OH (US)

(73) Assignee: Vesuvivs Crucible Company, Wilmington, DE (US)

( * ) Notice: Subject to any disclaimer, the term of this patent is extended or adjusted under 35 U.S.C. 154(b) by 135 days.

(21) Appl. No.: 12/675,272

(22) PCT Filed: Aug. 28, 2008

(86) PCT No.: PCT/US2008/074578
§ 371 (c)(1),
(2), (4) Date: Feb. 25, 2010

(87) PCT Pub. No.: WO2009/029704
PCT Pub. Date: Mar. 5, 2009

(65) Prior Publication Data
US 2010/0222201 A1    Sep. 2, 2010

Related U.S. Application Data

(60) Provisional application No. 60/969,024, filed on Aug. 30, 2007.

(51) Int. Cl.
| | |
|---|---|
| *C04B 14/00* | (2006.01) |
| *C04B 7/00* | (2006.01) |
| *C04B 7/34* | (2006.01) |
| *C04B 28/00* | (2006.01) |
| *C04B 32/00* | (2006.01) |
| *C04B 7/32* | (2006.01) |
| *C04B 7/36* | (2006.01) |
| *C04B 9/11* | (2006.01) |
| *C04B 11/28* | (2006.01) |

(52) U.S. Cl.
USPC ............ 106/812; 106/638; 106/692; 106/695

(58) Field of Classification Search
USPC ................. 106/638, 640, 641, 683, 692, 693, 106/695, 784, 816; 501/127, 128, 129
See application file for complete search history.

(56) References Cited

U.S. PATENT DOCUMENTS

| | | | |
|---|---|---|---|
| 3,930,874 A | 1/1976 | Guile et al. | |
| 3,940,279 A | 2/1976 | Guile et al. | |
| 3,948,671 A | 4/1976 | Guile et al. | |
| 4,366,258 A * | 12/1982 | Eschenberg | 501/124 |
| 4,588,443 A | 5/1986 | Bache et al. | |
| 5,333,670 A | 8/1994 | Brandy et al. | |
| 6,313,056 B1 | 11/2001 | Li | |
| 6,395,662 B1 * | 5/2002 | Li et al. | 501/127 |
| 2002/0022567 A1 | 2/2002 | Li et al. | |

OTHER PUBLICATIONS

Smith et al. Correlation between hydration mechanism and ultrasonic measurements in an aluminous cement; effect of setting time and temperature on the early hydration. Journal of the European Ceramic Society 22 (200) 1947-1958.*

(Continued)

*Primary Examiner* — Kaj K Olsen
*Assistant Examiner* — Noah Wiese
(74) *Attorney, Agent, or Firm* — Thomas Clinton; Donald M. Satina

(57) ABSTRACT

A low-water-content castable composition produces cast products with an increased modulus of rupture, an increased cold crushing strength, and decreased porosity. The composition employs closed fractions of constituent particles with specified populations and specified gaps in the particle size distribution to produce these properties. The composition is suitable for refractory applications.

20 Claims, 7 Drawing Sheets

OTHER PUBLICATIONS

"5.4.1 Refractory Castables" in Gerald Routschka: "Pocket Manual Refractory Materials", Jan. 1, 1997, Vulkan-Verlag, Essen (DE), XP002640745, ISBN: 3-8027-3147-6, pp. 196-205. p. 205, Product D in Table 7; Table 6, Product B2; Figures 1, 2 and 3.

Akira Nishikawa: "Technology of Monolithic Refractories.", Jan. 1, 1984, Plibrico Japan Co., Ltd, Japan, XP002640746, pp. 156-161. p. 157, lines 10-13; tables 2.82 and 2.83; Figure 2.57.

* cited by examiner

CAST BODIES, CASTABLE COMPOSITIONS, AND METHODS FOR THEIR PRODUCTION

FIELD OF THE INVENTION

The present invention relates to castable compositions with reduced matrix content, such as refractory compositions for lining the inner walls of vessels and furnaces intended to receive liquid metal, glass and the like. It also relates to cast bodies produced from these compositions and methods.

BACKGROUND OF THE INVENTION

A number of processes for producing a lining on the inner walls of a metallurgical vessel are known. Thus, for example, there is known, according to the prior art, a process in which an aqueous and pasty mixture capable of setting, containing inorganic particles, optionally fibers, and an organic and/or inorganic binder, is applied by molding, tamping or projecting with a trowel, pneumatic tube or other projecting device to the inside of a metallurgical vessel such as a casting tundish. The mixture of particles sinters in contact with the liquid metal, and this ensures the cohesion of the lining.

According to the prior art, there is also known a process according to which at least two layers of different compositions are applied to the inside of the metallurgical vessel, each being applied by projecting an aqueous and pasty mixture capable of setting of the above-mentioned type.

The fluidity of such aqueous and pasty mixtures, which expedites their application, is proportional to the amount of wetting water present. The wetting water employed for forming the aqueous mixture(s) must be removed by drying, and this involves an immobilization time and an expenditure of energy, neither of which can be ignored.

There is also known a process according to which a template is placed inside a metallurgical vessel, a material consisting of refractory particles and of a heat-curable binder is projected pneumatically between the template and the inner walls of the vessel, and heating is then applied while the template is left in place to cause the binder to set, and the template is finally removed. The cast material contains an inorganic compound containing water of crystallization. Water of crystallization is water in chemical combination with a crystal, necessary for the maintenance of crystalline properties but capable of being removed by sufficient heat.

It is also known that refractory bodies can be made by casting of refractory concretes either by vibration casting of a wet concrete or by vibration-free casting of a concrete having a self-flowing consistency. In both approaches, all concrete materials need to be homogeneously mixed and wetted. Customarily, matrix and coarse materials are batched together. Then water is added to give fluidity and to initiate a reaction that forms an end product of an ideal shape. To accomplish this, a large portion of the material is fine-grained matrix material. This material has a high surface area, which lends itself to attack in adverse conditions, such as most refractory applications. Larger proportions of water improve the fluidity of the mixture, but promote the formation of pores in the formed product. A high mixing water content in the castable means very long dry-out times and poor mechanical strength. Smaller proportions of water inhibit pore formation, but yield product pieces that are prone to cracking, crumbling and spalling. In extreme cases, formulations using small proportions of water are unable to form a coherent piece.

In order to increase thermal shock resistance, fibrous materials have been used in vibration-cast materials and in self-flowing materials. The use of fibrous materials increases the need for high levels of mixing water and makes casting more difficult. Very coarse materials which are beneficial for slag resistance due to their high density can only be used to a certain extent, because casting of concretes with a very high content of coarse materials is very difficult.

Infiltration processes are also used to produce objects containing coarse particulates intermingled with finer particulates introduced in the form of a slurry. For example, a mold may be filled with dry coarse particulates which can have a size between about 1 and 60 mm to form a formed dry body. The formed dry body is then infiltrated with a slurry consisting of a binder, water, and fine filler materials having a particle size distribution of between 0.0001 to 3 mm. Infiltration according to this method is a time-consuming process. The difficulty of production of a thick piece by this method increases with the piece's thickness, unless a larger aggregate is used.

The aim of the present invention is to overcome the disadvantages of the known compositions and to produce a product in which the amount of mixing water is minimized, the quantities of matrix material are minimized, the porosity of the formed dry body is minimized, the density of the formed dry body is increased, and a product having enhanced modulus of rupture and cold crushing strength values is produced.

BRIEF SUMMARY OF THE INVENTION

It has been found that certain compositional features, alone or in combination, yield castable materials that are able to be formulated with reduced amounts of water and exhibit increased density and reduced porosity when compared with the compositions of the prior art. These properties can be imparted to a formed body in the absence of sintering. These features include:

1) The coarsest refractory grain fraction makes up 50% by weight or greater of the dry composition; this fraction is separated from a smaller grain fraction by a gap having a ratio of smallest particle diameter to largest particle diameter such at least the square root of 2, or at least 2. For example, the coarsest refractory grain fraction may be composed of particles having diameters greater than 500, 800 or 1000 micrometers, and may be a closed fraction having maximum particle size, such as 1000, 2000 or 4000 micrometers.

2) The composition contains at least four grain fractions, of which three adjacent grain fractions, separated by gaps having a particle diameter ratio of at least the square root of two, or by gaps having a particle diameter ratio of at least two, have remaining weight percentages (percentage by weight of particle in the fraction with respect to the weight of all particles in the fraction plus all smaller particles) that are, with respect to the respective immediately larger particle size fractions and in order of decreasing particle size, smaller, larger and smaller in value. This configuration (larger, smaller, larger, smaller fractions) is designated as an "alternating remaining weight percentage" composition.

3) The composition contains at least four grain fractions, of which three adjacent grain fractions, separated by gaps having a particle diameter ratio of at least the square root of two, or by gaps having a particle diameter ratio of at least two, have remaining weight percentages (percentage by weight of particle in the fraction with respect to the weight of all particles in the fraction plus all smaller particles) that are, with respect to the respective immediately larger particle size fractions and in order of decreasing particle size, larger, smaller and larger in value. This configuration (smaller, larger, smaller, larger fractions) is also designated as an "alternating remaining weight percentage" composition.

4) The composition contains at least two, or at least three, grain fractions, separated by gaps having a particle diameter ratio of at least the square root of two, or a particle diameter ratio of at least two, entirely composed of particles with diameters less than 100 micrometers.

5) The composition contains at least four grain fractions, separated by gaps having a particle ratio diameter of at least the square root of two, or a particle diameter ratio of at least two, in which the remaining weight percentages are at least 40%.

6) The composition contains at least five grain fractions separated by gaps having a particle ratio diameter of at least the square root of two, or a particle diameter ratio of at least two.

7) At least two of the gaps each contain less than 10 percent by mass, or less than 5 percent by mass, of the mass of the dry composition.

Compositions incorporating one or more of these characteristics have been produced in which, with weight percentages of water of 6.0 wt %, 5.0 wt %, 4.0 wt %, 3.0 wt %, 2.5 wt % and 2.0 wt %, increased MOR (modulus of rupture), increased bulk density, decreased porosity and increased CCS (cold crushing strength) values are obtained with respect to the prior art.

With compositions of the present invention, MOR values (measured in pounds per square inch) of 1000 or greater, 2000 or greater, 3000 or greater, or 3500 or greater as measured after exposure to 230 degrees F., and 500 or greater, 1000 or greater, 2000 or greater, 3000 or greater, or 3500 or greater as measured after exposure to 1500 degrees F., can be obtained.

With compositions of the present invention, bulk density values (measured in pounds per cubic foot) of 190 or greater, 195 or greater, or 200 or greater as measured at 230 degrees F., and 185 or greater, 190 or greater, 195 or greater, or 200 or greater as measured after exposure to 1500 degrees F., can be obtained for formulations composed of 95 wt % alumina or greater.

With compositions of the present invention, porosities (measured as volume percent) of 15 or less, 10 or less, 5 or less, 4 or less, or 3 or less as measured after exposure to 230 degrees F., and 18 or less, 15 or less, 10 or less, 5 or less, 4 or less, or 3 or less as measured after exposure to 1500 degrees F., can be obtained.

With compositions of the present invention, CCS values (measured in pounds per square inch) of 3000 or greater, 5000 or greater, 8000 or greater, 10,000 or greater, and 12,000 or greater as measured after exposure to 230 degrees F., and 3000 or greater, 5000 or greater, 8000 or greater, 10,000 or greater, and 12,000 or greater as measured after exposure to 1500 degrees F., can be obtained.

DETAILED DESCRIPTION OF THE INVENTION

Figure 1:
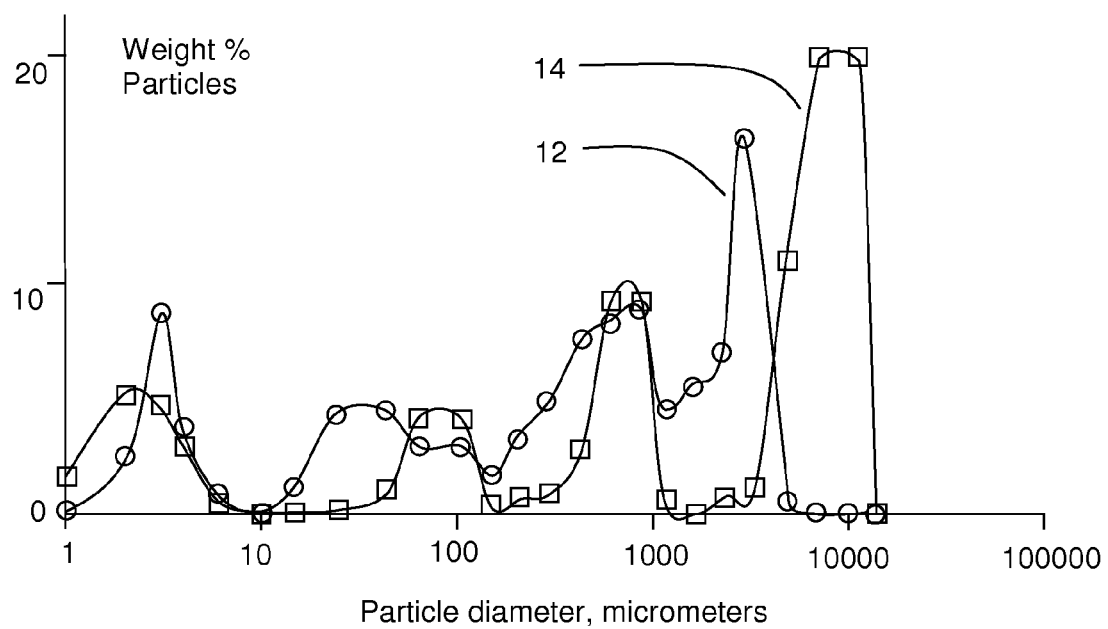
FIG. 1 is a graph of weight percentage of composition fractions, plotted against particle size on a logarithmic scale, for compositions of the prior art and of the present invention.

It has been found that the presence or combination of certain compositional features produces a refractory product in which the amount of mixing water is minimized, the quantities of matrix material are minimized, the porosity of the formed dry body is minimized, the density of the formed dry body is increased, and a product having enhanced modulus of rupture and cold crushing strength values is produced. These properties can be imparted to a formed body in the absence of sintering.

The coarse aggregates useful in practicing the present invention may contain fused alumina or sintered alumina (tabular alumina), whole alumina balls, fused bauxite, fused and sintered mullite, fused and sintered magnesia, fused and sintered magnesia aluminum spinel, fused and sintered zirconia, refractory bauxites, refractory kyanite, refractory andalusite, refractory sillimanite, silicon carbide or combinations thereof.

The coarse aggregates useful in practicing the present invention can have any shape. They can be spherical, blocky, rectangular or even fibrous. In addition, they may be used alone or in combination.

The binder used in the matrix may contain calcium aluminate cement, alpha bond cement, Portland cement, monoaluminum phosphate (MAP), clays, reactive alumina (such as AA 101), hydratable alumina, and combinations thereof. In certain embodiments, the matrix material according to the present invention does not contain cement.

Other raw materials used in the matrix may include reactive aluminas, calcined alumina, tabular alumina, fused alumina, mullite, carbon (graphite or carbon black), silicon carbide, zirconium dioxide, magnesium oxide, aluminum silicates (such as kyanite, andalusite, or sillimanite), micro silica, bauxite, chromium oxide and combinations thereof. The portion of the formulation having diameters in the range of 0.01 to 10 micrometers, also known as the fines, may contain reactive aluminas and fume silicas.

The matrix may also contain dispersing agents, plasticizers, anti-foaming or foaming agents and de-airing components. These agents are well known in the art.

The method of the invention produces castable mixtures with a minimal volume of fine grains. Generally, the amount of fine grains needed to create a castable is dependent on the size of the top size grain. Mixes with a top grain size of 3 mesh typically need a minimum of 33 volume percent −100 mesh grains to form a functional castable mixture. Useful castable mixtures with 30 volume percent or less −100 mesh grains, 29 volume percent or less −100 mesh grains, 26 volume percent or less −100 mesh grains, 25 volume percent or less −100 mesh grains, 22 volume percent or less −100 mesh grains or from, and including, 24 volume percent to, and including, 18 volume percent −100 mesh grains, can be produced according to the present invention.

Castable mixtures with a 3 mesh top grain size typically require a minimum of 48 volume percent −16 mesh grains to form a functional castable mixture. Useful castable mixtures with 47 volume percent or less −16 mesh grains, 45 volume percent or less −16 mesh grains, or 43 volume percent or less −16 mesh grains, can be produced according to the present invention.

Castable mixtures with a 3 mesh top grain size typically need a minimum of 58 volume percent −6 mesh grains to form a functional castable mixture. Useful castable mixtures with 55 volume percent or less −6 mesh grains, 47 volume percent or less −6 mesh grains, 42 volume percent or less −6 mesh grains, or 36 volume percent or less −6 mesh grains can be produced according to the present invention. Regardless of the top grain size, a minimum volume of fine aggregate is needed for prior art castable mixtures. These minimum volumes are similar to the values given for mixes with a top grain size of 3 mesh. Mesh values are expressed here as Tyler values.

Additionally, the maximum volume percent values for −6 mesh grains, −14 mesh grains, −16 mesh grains, −28 mesh and −100 mesh grains presented for castable mixtures with a top grain size of 3 mesh may also be used to produce castable mixtures according to the invention having a top grain size or aggregate larger than 3 mesh. For example, −3/8" aggregates, 1/2"×1/4" aggregates, −1/2" aggregates, −3/4" aggregates and −1" aggregates, mixtures of these aggregates and aggregates having a top grain size within the range of, and including, 3 mesh and 12" may be used to produce castable compositions according to this invention.

The method of the invention produces cast bodies with densities previously unattainable for the compositions used. Alumina-based cast objects of the prior art may have densities up to 202 pounds per cubic foot in the green state if they incorporate chromium oxide. Green state materials contain free water; this water is removed by heating to 230° F. Alumina-based cast objects with densities, in the green state, of 204 pounds per cubic foot or greater, or 210 pounds per cubic foot or greater, can be produced according to the present invention.

Alumina-based cast objects of the prior art may have densities up to 199 pounds per cubic foot after drying to 230° F. if they incorporate chromium oxide, or 196 pounds per cubic foot in the green state if they incorporate only aluminas. Alumina-based cast objects with densities, after drying to 230° F., of 200 pounds per cubic foot or greater, 202 pounds per cubic foot or greater, or 207 pounds per cubic foot or greater, can be produced according to the present invention.

The method of the present invention produces cast bodies with densities, with respect to theoretic densities, previously unattainable. The theoretic density refers to the highest density attainable for a substance (i.e., a solid sample containing no gaps, as distinguished from a packed powder having gaps between particles). Alumina has a theoretic density of 247.53 pounds per cubic foot. The prior art can produce materials with $(196.0/247.53) \times 100\%$ or 79.2% of theoretic density, or $(199.0/247.53) \times 100\%$ or 80.3% of theoretic density. Materials produced according to the present invention may have $(200.0/247.53) \times 100\%$ or 80.7% of theoretic density or greater, or densities that equal or exceed 83.6% of theoretic density.

The method of the invention enables the production of castable material with a reduced quantity of liquid. Prior art castable materials typically contain at least 3.7 wt % liquid. Castable material can be produced according to the present invention with 3.3 wt % liquid or less, 3.0 wt % liquid or less, 2.0 wt % liquid, or 1.7 wt % liquid or less. Prior art castable materials typically contain at least 10.9 vol % liquid. Castable material can be produced according to the present invention with 9.1 vol % liquid or less, or 7.8 vol % liquid or less. These percentages are expressed with respect to a total weight or volume of aggregate, matrix, fines and water.

The method of the invention enables the production of cast bodies with reduced porosity. Cast bodies produced by prior art casting techniques have, after heating to 1500° F., porosity levels of no less than 13%. Cast bodies can be produced according to the present invention with porosity levels less than 13%, less than 12%, less than 11%, less than 10%, less than 9%, less than 8%, less than 7%, less than 6%, less than 5%, less than 4%, or less than 3%.

In a process according to the invention, cast shapes, cast structures and cast products, such as columnar structures, may be constructed with the castable compositions of the invention. The method comprises steps of (a) providing a mold having a cavity which corresponds to the size and shape of the structure or cast product, (b) filling the cavity with a castable composition of the invention, (c) optionally subjecting the castable composition of the invention to compacting and/or vibration, (d) curing the castable composition to form the cast shape, cast structure or cast product, and (e) separating the mold from the cast shape, cast structure or cast product. The compositions of the present invention may also be used in a compression forming procedure, in which the wet composition is placed in a mold and subjected to mechanical or hydraulic pressing or other compression processes to form a piece or cast product of the desired shape.

The castable compositions of the invention may be heated to obtain good green strengths for demolding. Heating to 110° C. may be used to react the reactive alumina. Alternatively, or in addition, a cement may be used in the fine-grained material to provide green strength.

The examples presented in Table I were cast using tabular alumina sized as indicated and Secar 71 cement as a binder. Secar 71 is a hydraulic binder with an alumina content of approximately 70%. ULM2 is a composition of the present invention having four peaks in particle diameter distribution; two of the peaks correspond to particles having diameters of 250 micrometers or less. ULM3 and ULM3B are two compositions of the present invention having three particle diameter distribution peaks corresponding to particles having diameters of 1000 micrometers or less. PA1 and PA2 are prior art compositions. ULM1 is a composition of the present invention that was derived from composition PA2 by alteration of the particle distribution of the sub-100-micrometer (or −60 mesh) range, and by introduction of gaps in that range.

The "loading" values in Tables I and II represent remaining weight percentages, defined as the percentage by weight of particles in a given fraction with respect to the weight of all particles in the fraction plus all smaller particles. For example, the fraction containing the largest particles in ULM2 contains 53 wt % of the alumina and silica in the composition. The fraction containing the second-largest particles contains 50 wt % of the remaining particles. The fraction containing the third-largest particles contains 35 wt % of the remaining particles. The fraction containing the fourth-largest particles, which are also the smallest particles, contains 100 wt % of the remaining particles.

The compositions ULM 1, ULM 3 and ULM3B contain four or more fractions having an alternating remaining weight configuration. PA1 and PA2 lack such a configuration. ULM2 also lacks a four-fraction alternating remaining weight configuration, but does have two peaks corresponding to particles having diameters of 250 micrometers or less.

The compositions PA1 and PA2 required the quantities of water shown (6.34 wt % and 5.25 wt % respectively) to produce a cast product.

A3000FL is a superground, bimodal reactive alumina with a d50 of approximately 2.5-3 micrometers and a specific surface area measured by the BET (Brunauer-Emmett-Teller) method of typically 1.3-2 square meters per gram. A152SG is a superground alumina having a monomodal particle size distribution with a median particle size of 1.2 micrometers. RG 4000 is a monomodal reactive alumina with a d50 of 0.5-0.8 micrometers. Dispex N100 is a sodium polyacrylate dispersant.

Present invention ultra-low matrix compositions ULM1, ULM2, ULM3 and ULM3B show increases in MOR, bulk density, and CCS, and decreased porosity when compared with prior art compositions PA1 and PA2. The components and properties of these compositions are presented in Table I.

TABLE I

Comparison of Components and Physical Properties

|  | ULM2 | ULM3 | ULM3B | PA1 Prior Art | PA2 Prior Art | ULM1 |
|---|---|---|---|---|---|---|
|  | Loading | | | | | |
|  | 53/50/ 35/100 | 48/33/ 48/33/ 48/100 | 48/33/ 48/33/ 48/100 | 45/45/ 100 | 40/33/ 38/100 | 40/33/ 38/33/ 48/100 |
| Alumina, Tabular, T-64, −½" + ¼" | 53.00 | 48.00 | | | | |
| Alumina, Tabular, T-64, −3 + 6M | | | 48.00 | 45.00 | 40.00 | 40.00 |
| Alumina, Tabular, T-1064, 6 + 14 | | 15.02 | | | | |
| Alumina, Tabular, T-1064, 14 × 28 | 20.80 | 2.15 | 15.02 | | 20.00 | 20.00 |
| Alumina, Tabular, T-64, −28M | 2.82 | | | | | |
| Alumina, Tabular, T-64, −28 + 48M | | 11.20 | 2.15 | 25.00 | | |
| Alumina, Tabular, T-64, −40 + 60M | | | 10.50 | | 15.00 | 15.00 |
| Alumina, Tabular, T-1064, −48M | | 5.52 | 6.22 | | | |
| Alumina, Tabular, T-64, −100M | 8.18 | 5.98 | 5.98 | 26.00 | 21.00 | 8.28 |
| Cement, Secar 71 (Domestic) | 4.00 | 4.00 | 4.00 | 4.00 | 4.00 | 4.00 |
| Alumina, White Fused, −325M | | 1.64 | 1.64 | | | 3.82 |
| Alumina, Reactive, A3000FL | 3.88 | 1.86 | 1.86 | | | 2.58 |
| Alumina, Reactive, A152SG | 4.26 | 2.04 | 2.04 | | | 2.83 |
| Alumina, Reactive, RG4000 | 1.29 | 0.62 | 0.62 | | | 0.86 |
| Silica Fume 971 | 1.62 | 1.90 | 1.90 | | | 2.63 |
| Boric Acid Powder | 0.02 | 0.02 | 0.02 | 0.02 | 0.02 | 0.02 |
| Dispex N100 | 0.05 | 0.05 | 0.05 | 0.05 | 0.05 | 0.05 |
| Water | 2.30 | 2.25 | 2.50 | 6.34 | 5.25 | 2.10 |
| Properties | | | | | | |
| MOR (psi) 230 F. | 4,600 | 3,900 | 4,700 | 700 | 800 | 4,100 |
| MOR (psi) 1500 F. | 7,000 | 6,200 | 6,100 | 300 | 400 | 8,300 |
| Bulk Density (pcf) 230 F. | 209 | 207 | 203 | 186 | 187 | 203 |
| Bulk Density (pcf) 1500 F. | 207 | 205 | 201 | 183 | 183 | 201 |
| Porosity (%) 230 F. | 1.4 | 1.9 | 2.6 | 17.7 | 17.0 | 1.3 |
| Porosity (%) 1500 F. | 6.9 | 7.8 | 7.7 | 20.2 | 20.2 | 4.1 |
| CCS (psi) 230 F. | 16,900 | 12,600 | 15,200 | 1,500 | 2,200 | 13,100 |
| CCS (psi) 1500 F. | 15,700 | 17,300 | 11,700 | 1,800 | 1,800 | 14,600 |

Present invention compositions ULM-FG, ULM-PG and ULM-671 are able to produce cast shapes with decreased percentages of water when compared with prior art composition PA2. Compositions are presented in Table II; a comparison of properties of cast shapes produced with the addition of various proportions of water is presented in Table III.

TABLE II

Comparison of Compositions

| | PA2 | ULM-FG | ULM-PG | ULM-671 |
|---|---|---|---|---|
| | | Loading | | |
| | 40/33/ 38/100 | 40/30/ 40/30/ 40/100 | 40/30/ 40/30/ 40/100 | 40/30/ 40/30/ 40/100 |
| Alumina, Tabular, T-64, −½" + ¼" | — | — | — | — |
| Alumina, Brown Fused, −⅜ + 3M | | 40.00 | 40.00 | |
| Alumina, Tabular, T-64, −3 + 6M | 40.00 | | | 40.00 |
| Alumina, Tabular, T-1064, 6 + 14 | | 18.00 | 15.75 | |
| Alumina, Tabular, T-1064, 14 × 28 | 20.00 | | 2.25 | 18.00 |
| Alumina, Tabular, T-64, −28M | | | | |
| Alumina, Tabular, T-64, −28 + 48M | | 16.80 | 11.26 | |
| Alumina, Tabular, T-64, −40 + 60M | 15.00 | | | 16.80 |
| Alumina, Tabular, T-1064, −48M | | | 5.54 | |
| Alumina, Tabular, T-64, −100M | 21.00 | 7.56 | 7.56 | 7.56 |
| Cement, Secar 71 (Domestic) | 4.00 | 4.00 | 4.00 | 4.00 |
| Alumina, White Fused, −325M | | 2.84 | 2.84 | 2.84 |
| Alumina, Reactive, A3000FL | | 3.13 | 3.13 | 3.13 |
| Alumina, Reactive, A152SG | | 3.44 | 3.44 | 3.44 |
| Alumina, Reactive, RG4000 | | 1.04 | 1.04 | 1.04 |
| Silica Fume 971 | | 3.20 | 3.20 | 3.20 |
| Boric Acid Powder | 0.02 | 0.02 | 0.02 | 0.02 |
| Dispex N100 | 0.05 | 0.05 | 0.05 | 0.05 |
| Water | 2.00-6.00 | 2.00-6.00 | 2.00-3.00 | 2.00-3.00 |

All samples were subjected to 30 seconds of dry mixing, 4.5 minutes of wet mixing, 4 minutes of high vibration and 1 minute of low vibration. KBD values are bulk densities measured in pounds per cubic foot. KPOR values are porosity values measured as volume percent. Both the KBD values and KPOR values are 1500 degree F. values. The designation DNB is given to compositions that did not bond. The designation DNC is given to compositions that did not consolidate.

In certain compositions, such as the ultra-low-matrix compositions of the present invention in which high proportions of water were added for comparison purposes, segregation of particle fractions was observed. Table values designated as "full" are measurements of pieces representing a complete top-to-bottom cross section of a sample. Table values designated as "bottom" are measurements of a portion of a sample closer to the vibration source. Percentages of water in Table III are weight percentages.

TABLE III

Properties of Pieces Cast from Prior Art and Present Invention Compositions

| | Observations | KBD Avg. Full | KPOR Avg. Full | KBD Avg. Bottom | KPOR Avg. Bottom |
|---|---|---|---|---|---|
| PA2 2 wt % water | DNB | — | — | — | — |
| PA2 3 wt % water | DNC | 163.1 | 28.1 | 163.2 | 27.1 |
| PA2 4 wt % water | DNC | 164.2 | 25.7 | 163.1 | 26.6 |
| PA2 5 wt % water | | 190.6 | 17.2 | 193.9 | 16.2 |
| PA2 6 wt % water | Wet | 188.1 | 18.7 | 190.0 | 17.7 |
| ULM - FG 2 wt % water | | 210.4 | 4.9 | 206.3 | 3.9 |
| ULM - FG 3 wt % water | | 211.2 | 7.8 | 210.1 | 6.6 |
| ULM - FG 4 wt % water | Wet | 206.5 | 9.8 | 211.1 | 7.4 |
| ULM - FG 5 wt % water | Wet | 202.9 | 11.6 | 210.8 | 8.6 |
| ULM - FG 6 wt % water | Wet | 198.6 | 14.0 | 209.5 | 9.5 |
| ULM - PG 2 wt % water | | 209.8 | 4.5 | 205.7 | 5.0 |
| ULM - PG 3 wt % water | | 211.1 | 7.9 | 212.4 | 6.0 |
| ULM-671 2 wt % water | DNB DNC | — | — | — | — |
| ULM-671 3 wt % water | | 201.6 | 6.7 | 197.7 | 8.8 |

FIG. 1 contains a comparison of a particle size distribution 12 according to the prior art with a particle size distribution 14 according to the present invention. Particle size distribution 14 corresponds to composition ULM 2 in Table I. In this figure, the weight percentages for particles in the dry composition are plotted as a function of particle sizes (expressed in micrometers on a logarithmic scale).

Criterion SR 92 CF is a fine particle material that may be used to produce cast bodies according to the prior art. It contains a fine activated alumina binder. Its grain size distribution, expressed in mesh, and its chemical composition are compared, in Tables IV and V, with that of a fine particle material, exhibiting a particle size gap, according to the present invention.

TABLE IV

Comparison of Particle Size Fractions
of the Invention with the Prior Art

|  | Criterion SR 92 CF, percent | Material of the invention, percent |
|---|---|---|
| +3M | 0.0 | 41.7 |
| 3 × 4M | 0.3 | 5.5 |
| 4 × 6M | 15.8 | 9.9 |
| 6 × 8M | 7.3 | 0.6 |
| 8 × 12M | 5.6 | 0.0 |
| 12 × 16M | 4.7 | 0.2 |
| 16 × 20M | 8.4 | 3.2 |
| 20 × 30M | 6.3 | 2.7 |
| 30 × 40M | 3.5 | 1.5 |
| 40 × 50M | 7.6 | 4.5 |
| 50 × 70M | 3.2 | 1.9 |
| 70 × 100M | 2.6 | 1.6 |
| −100M | 34.6 | 26.7 |

TABLE V

Comparison of the Chemical Composition
of the Invention with the Prior Art

|  | Criterion SR 92 CF, weight percent | Material of the invention, weight percent |
|---|---|---|
| $SiO_2$ | 1.1 | 1.8 |
| $Fe_2O_3$ | 0.1 | 0.1 |
| $Al_2O_3$ | 87.1 | 91.7 |
| MgO | 5.6 | 3.5 |
| CaO | 0.0 | 0.1 |
| $Na_2O$ | 0.2 | 0.2 |
| $P_2O_5$ | 0.0 | 0.0 |
| $K_2O$ | 0.0 | 0.0 |
| $Cr_2O_3$ | 0.0 | 0.0 |
| $TiO_2$ | 0.0 | 0.0 |
| $B_2O_3$ | 0.0 | 0.0 |
| $ZrO_2$ | 0.0 | 0.0 |
| SiC | 0.0 | 0.0 |
| C | 0.0 | 0.0 |
| Other | 0.0 | 0.0 |
| LOI | 5.9 | 2.7 |

Figure 2:
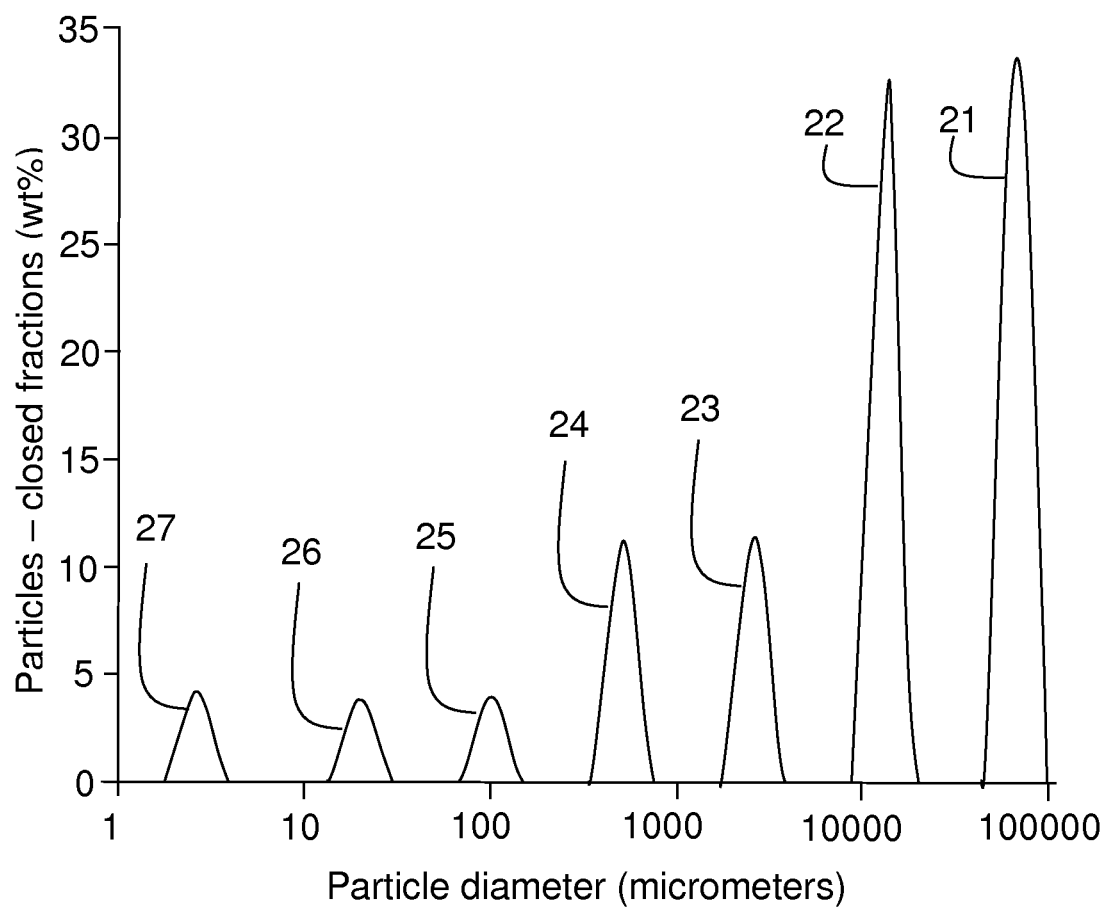
FIG. 2 is a graph of weight percentage of composition fractions, plotted against particle size on a logarithmic scale, for a composition of the present invention.

FIG. 2 depicts a particle size distribution according to the present invention in which six fractions have an alternating remaining weight percentage configuration, alternating between 33% and 48% until the final fraction is reached. Although the weight percentages of the fractions decrease with decreasing particle size until the last fraction is reached, the six largest fractions exhibit an alternating remaining weight percentage configuration. The first fraction 21 contains 33 wt % of the particles; 67 wt % of the particles remain. The second fraction 22 contains (67*0.48) or 32.2 wt % of the particles. The first two fractions thus contain 65.2 wt %; 34.8 wt % remain. The third fraction 23 contains (34.8*0.33) or 11.5 wt % of the particles. The first three fractions thus contain 76.7 wt %; 23.3 wt % remain. The fourth fraction 24 contains (23.3*0.48) or 11.2 wt % of the particles. The first four fractions thus contains 87.9 wt %; 12.1 wt % remain. The fifth fraction 25 contains (12.1*0.33) or 4.0 wt % of the particles. The first five fractions thus contain 91.9 wt %; 8.1 wt % remain. The sixth fraction 26 contains (8.1*0.48) or 3.9 wt %. The first six fractions thus contain 95.8 wt %; 4.2 wt % remain. The seventh fraction 27 is the only fraction remaining, so it contains 4.2 wt % of the particles, or 100 wt % of the particles remaining.

Figure 3:
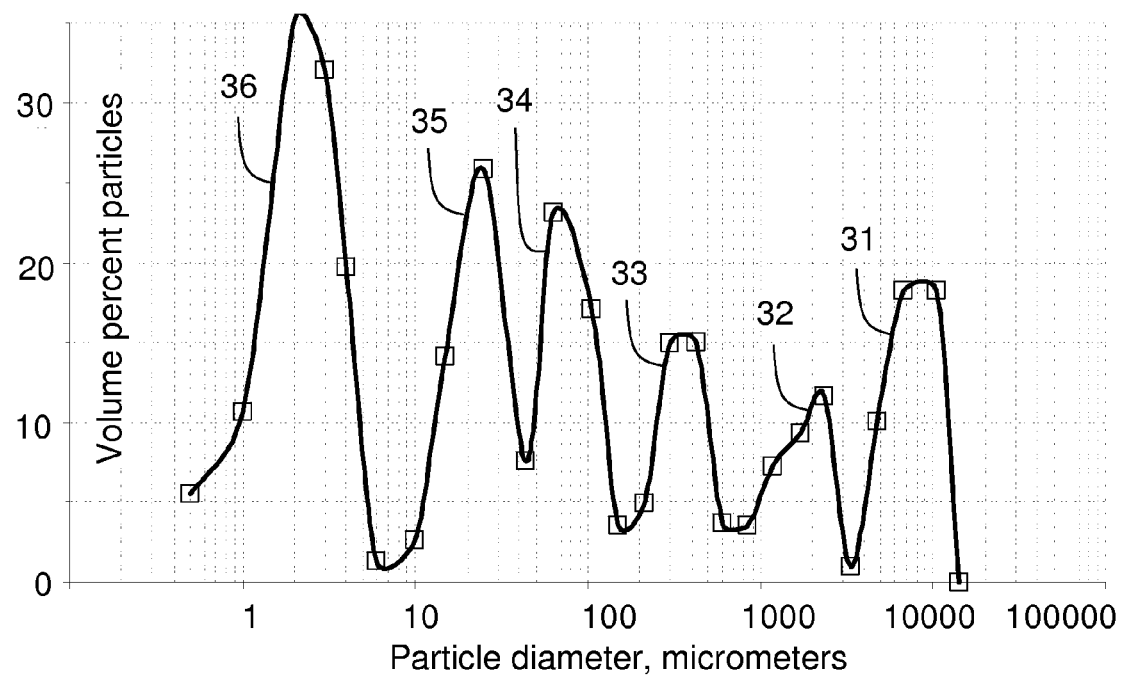
FIG. 3 is a graph of volume percentage of composition fractions, plotted against particle size on a logarithmic scale, for a composition of the present invention.

FIG. 3 depicts the particle size distribution for ULM3, a composition of the present invention. In this figure, the volume percentages for particles in the dry composition are plotted as a function of particle sizes, expressed in micrometers, on a logarithmic scale. First fraction 31, second fraction 32, third fraction 33, fourth fraction 34, fifth fraction 35 and sixth fraction 36 are shown. First fraction 31 has a remaining volume percentage of 48%. The remaining volume percentage is 32% for second fraction 32, 42% for third fraction 33, 48% for fourth fraction 34, and 44% for fifth fraction 35. The remaining volume percentage is the percentage of the volume of particles in the indicated range with respect to the sum of the volume of particles in all ranges in which particles have the same or smaller diameters than in the indicated range. Sixth fraction 36, the fraction containing the smallest particles, has a remaining volume percentage of 100%.

Figure 4:
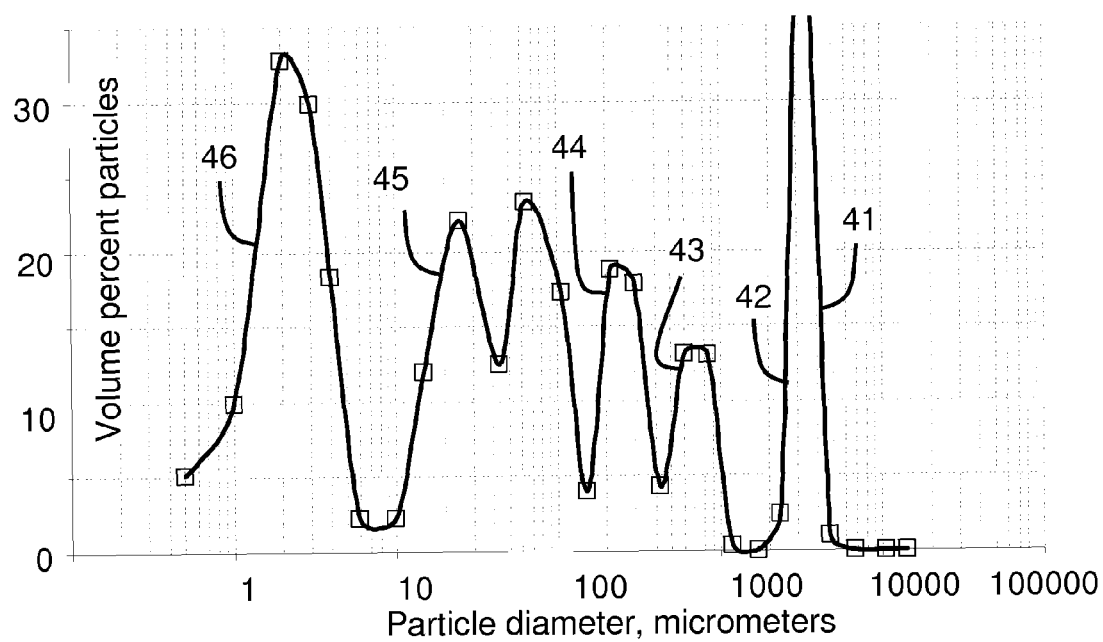
FIG. 4 is a graph of volume percentage of composition fractions, plotted against particle size on a logarithmic scale, for a composition of the present invention.

FIG. 4 depicts the particle size distribution for ULM3B, a composition of the present invention. In this figure, the volume percentages for particles in the dry composition are plotted as a function of particle sizes, expressed in micrometers, on a logarithmic scale. First fraction 41, second fraction 42, third fraction 43, fourth fraction 44, fifth fraction 45 and sixth fraction 46 are shown. First fraction 41 has a remaining volume percentage of 48%. The remaining volume percentage is 30% for second fraction 42, 41% for third fraction 43, 41% for fourth fraction 44, and 49% for fifth fraction 45. The remaining volume percentage is the percentage of the volume of particles in the indicated range with respect to the sum of the volume of particles in all ranges in which particles have the same or smaller diameters than in the indicated range. Sixth fraction 46, the fraction containing the smallest particles, has a remaining volume percentage of 100%.

Figure 5:
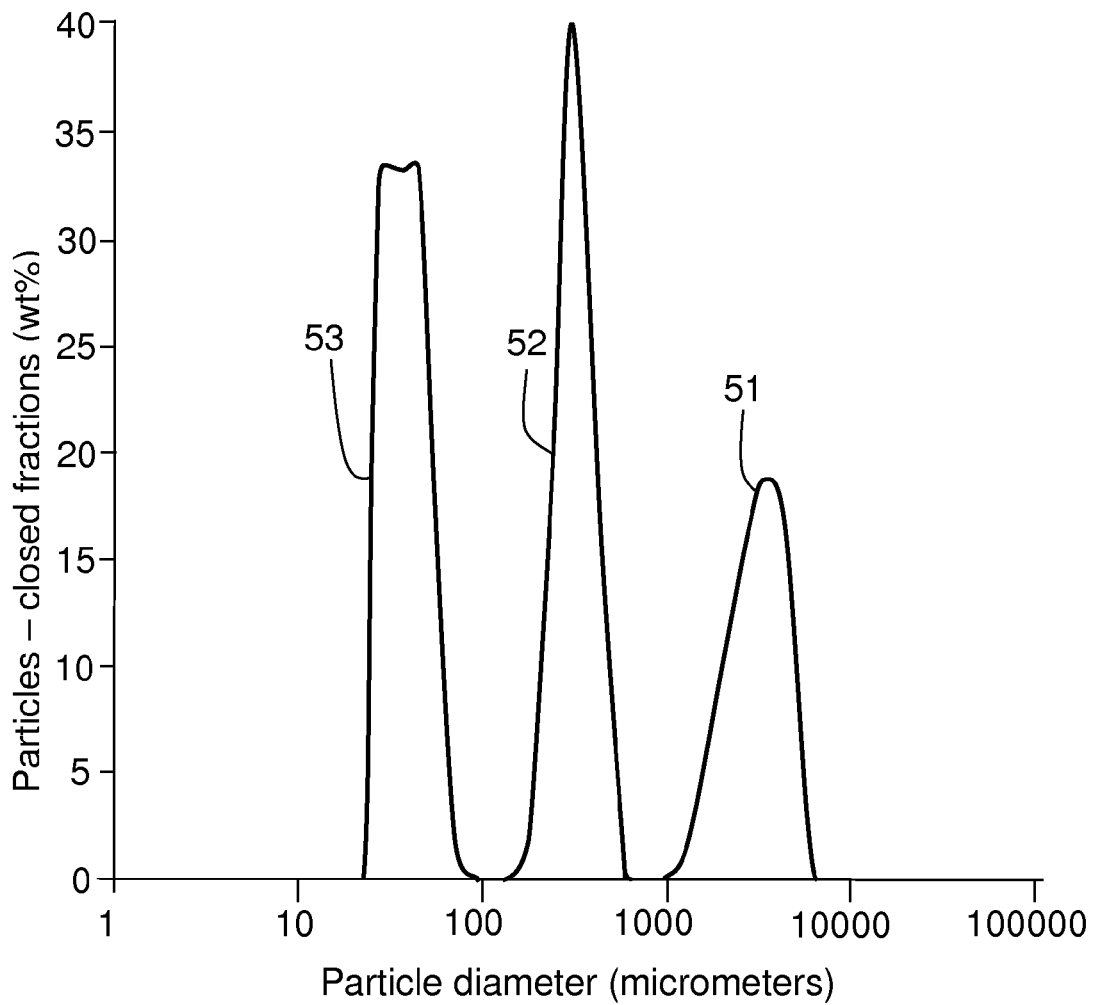
FIG. 5 is a graph of weight percentage of composition fractions, plotted against particle size on a logarithmic scale, for a composition of the prior art.

FIG. 5 contains a plot of percentage by mass of particle fractions with respect to particle diameter in micrometers of PA1, a composition of the prior art. The plot depicts first fraction 51, second fraction 52 and third fraction 53. Third fraction 53 contains all the material in the composition having a diameter of 100 micrometers or less, and exhibits a single peak. First fraction 51 contains 45 percent of the remaining weight, second fraction 52 contains 46 percent of the remaining weight, and third fraction 53 contains 100 percent of the remaining weight.

Figure 6:
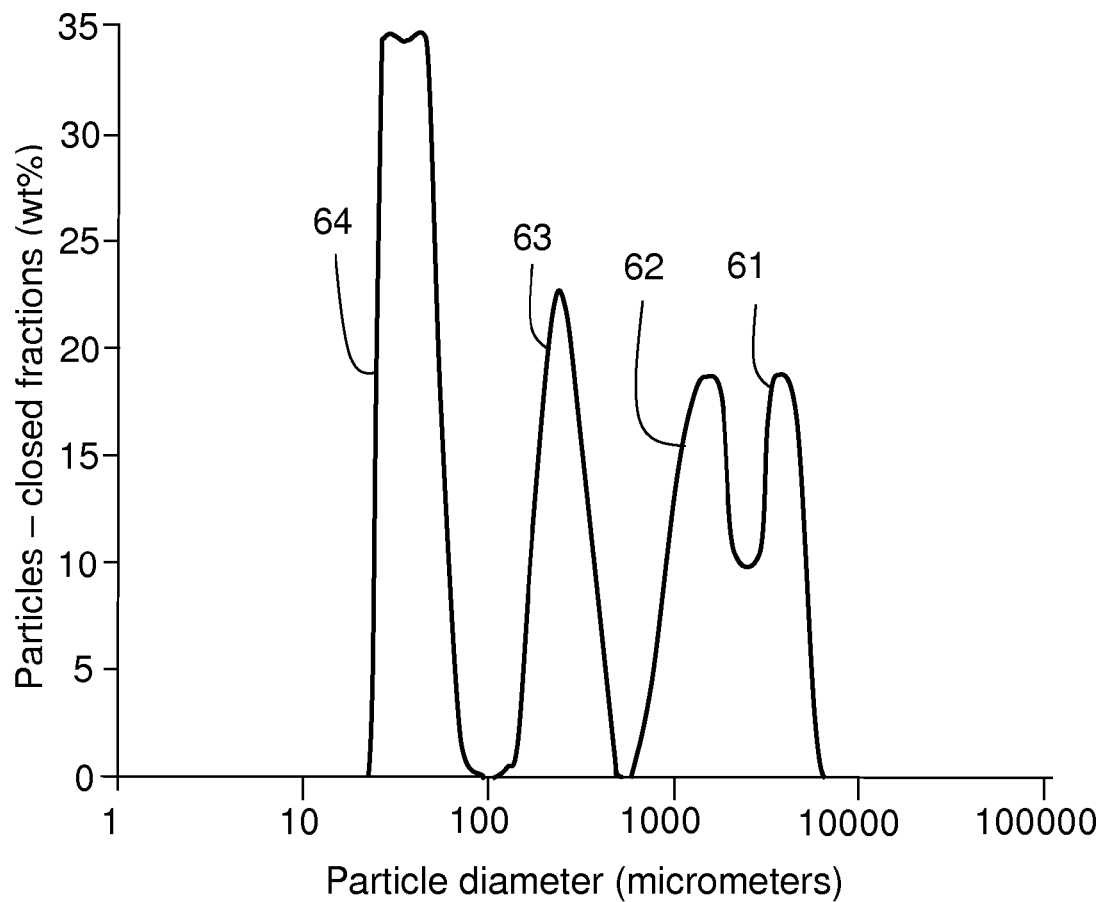
FIG. 6 is a graph of weight percentage of composition fractions, plotted against particle size on a logarithmic scale, for a composition of the prior art.

FIG. 6 contains a plot of percentage by mass of particle fractions with respect to particle diameter in micrometers of PA2, a composition of the prior art. The plot depicts first fraction 61, second fraction 62, third fraction 63 and fourth fraction 64. Fourth fraction 64 contains all the material in the composition having a diameter of 100 micrometers or less, and exhibits a single peak. First fraction 61 contains 40 percent of the remaining weight, second fraction 62 contains 33 percent of the remaining weight, third fraction 63 contains 38 percent of the remaining weight, and fourth fraction 64 contains 100 percent of the remaining weight.

Figure 7:
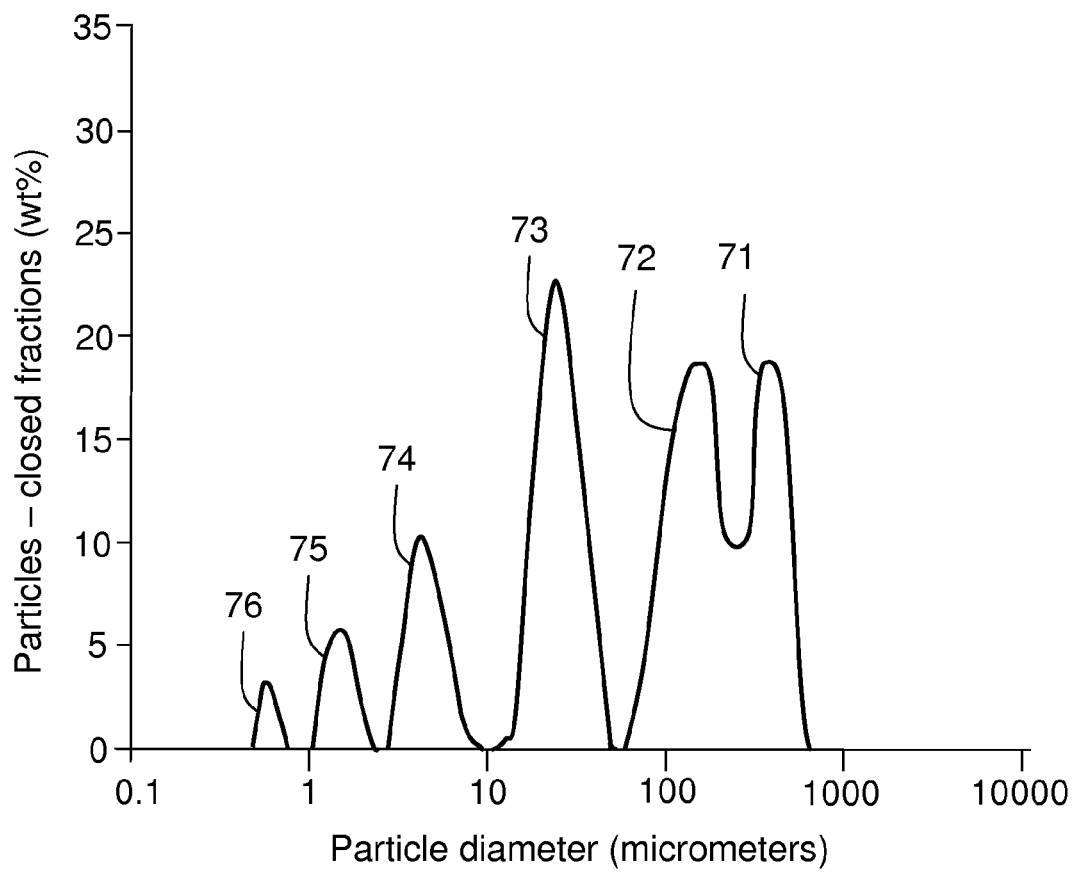
FIG. 7 is a graph of weight percentage of composition fractions, plotted against particle size on a logarithmic scale, for a composition of the present invention.

FIG. 7 contains a plot of percentage by mass of particle fractions with respect to particle diameter in micrometers of ULM1, a composition of the present invention. The plot depicts first fraction 72, second fraction 72, third fraction 73, fourth fraction 74, fifth fraction 75, and sixth fraction 76. Fractions 71, 72 and 73 contain the same weight percent as the analogous fractions in PA2. However, the sub-1000-micrometer portion of the PA2 particle distribution exhibits a single peak, whereas the sub-1000-micrometer portion of ULM1 exhibits three fractions, namely fractions 74, 75 and 76.

The invention encompasses:

1. A castable composition producing, when cast with a water content of 2.8 wt % or less, a cast product having a porosity equal to or less than 15 volume percent when measured after exposure to 230 degrees F.

2. A castable composition producing, when cast with a water content of 2.8 wt % or less, a cast product having a modulus of rupture equal to or greater than 1000 pounds per square inch as measured after exposure to 230 degrees F.

3. A castable composition producing, when cast with a water content of 2.8 wt % or less, a cast product having a cold crushing strength equal to or greater than 3000 pounds per square inch as measured after exposure to 230 degrees F.

4. A castable composition according to claim 1, wherein the cast product has a porosity equal to or less than 10 volume percent as measured after exposure to 230 degrees F.

5. A castable composition according to claim 1, wherein the cast product has a porosity equal to or less than 9 volume percent as measured after exposure to 230 degrees F.

6. A castable composition according to claim 1, wherein the cast product has a porosity equal to or less than 8 volume percent as measured after exposure to 230 degrees F.

7. A castable composition according to claim 1, wherein the cast product has a porosity equal to or less than 7 volume percent as measured after exposure to 230 degrees F.

8. A castable composition according to claim 1, wherein the cast product has a porosity equal to or less than 6 volume percent as measured after exposure to 230 degrees F.

9. A castable composition according to claim 1, wherein the cast product has a porosity equal to or less than 5 volume percent as measured after exposure to 230 degrees F.

10. A castable composition according to claim 1, wherein the cast product has a porosity equal to or less than 4 volume percent as measured after exposure to 230 degrees F.

11. A castable composition according to claim 1, wherein the cast product has a porosity equal to or less than 3 volume percent as measured after exposure to 230 degrees F.

12. A castable composition according to any of claims 1, 4, 5, 6, 7, 8, 9, 10 and 11, wherein the porosities are obtained by measurement after exposure to 1500 degrees F.

13. A castable composition according to claim 2, wherein the cast product has a modulus of rupture equal to or greater than 2000 pounds per square inch as measured after exposure to 230 degrees F.

14. A castable composition according to claim 2, wherein the cast product has a modulus of rupture equal to or greater than 3000 pounds per square inch as measured after exposure to 230 degrees F.

15. A castable composition according to claim 2, wherein the cast product has a modulus of rupture equal to or greater than 4000 pounds per square inch as measured after exposure to 230 degrees F.

16. A castable composition according to any of claims 2, 13, 14 and 15, wherein the modulus of rupture values are obtained by measurement after exposure to 1500 degrees F.

17. A castable composition according to claim 3, wherein the cast product has a cold crushing strength of 5000 pounds per square inch as measured after exposure to 230 degrees F.

18. A castable composition according to claim 3, wherein the cast product has a cold crushing strength of 8000 pounds per square inch as measured after exposure to 230 degrees F.

19. A castable composition according to claim 3, wherein the cast product has a cold crushing strength of 10,000 pounds per square inch as measured after exposure to 230 degrees F.

20. A castable composition according to claim 3, wherein the cast product has a cold crushing strength of 12,000 pounds per square inch as measured after exposure to 230 degrees F.

21. A castable composition according to any of claims 3, 17, 18, 19 and 20, wherein the cold crushing strength is obtained by measurement after exposure to 1500 degrees F.

22. A castable composition according to any of claims 1-21, characterized by a coarsest refractory grain fraction comprising at least 50% by weight of the dry composition, and wherein the coarsest refractory grain fraction is separated from a smaller grain fraction by a gap having a ratio of largest particle diameter to smallest particle diameter of at least the square root of 2.

23. A castable composition according to any of claims 1-21, in which the composition contains at least four grain fractions, of which three adjacent grain fractions are separated by gaps having a particle diameter ratio of at least the square root of two, and the three adjacent grain fractions have remaining weight percentages that are, with respect to the respective immediately larger particle size fractions and in order of decreasing particle size, smaller, larger and smaller in value.

24. A castable composition according to any of claims 1-21, in which the composition contains at least four grain fractions, of which three adjacent grain fractions are separated by gaps having a particle diameter ratio of at least the square root of two, and the three adjacent grain fractions have remaining weight percentages that are, with respect to the respective immediately larger particle size fractions and in order of decreasing particle size, larger, smaller, and larger in value.

25. A castable composition according to any of claims 1-21, wherein the composition contains at least two grain fractions separated by gaps having a particle diameter ratio of at least the square root of two, and the at least two grain fractions are entirely composed of particles with diameters less than 100 micrometers.

26. A castable composition according to any of claims 1-21, wherein the composition contains at least three grain fractions separated by gaps having a particle diameter ratio of at least the square root of two, and the at least three grain fractions are entirely composed of particles with diameters less than 100 micrometers.

27. A castable composition according to any of claims 1-21, wherein the composition contains at least four grain fractions separated by gaps having a particle ratio diameter of at least the square root of two, and the remaining weight percentages are at least 40% in each of the at least four grain fractions.

28. A castable composition according to any of claims 1-21, wherein the composition contains at least five grain fractions separated by gaps having a particle ratio diameter of at least the square root of two.

29. A castable composition according to any of claims 23-28, wherein at least two of the gaps each contain less than 10 percent by mass of the mass of the dry composition.

30. A castable composition according to any of claims 23-28, wherein at least two of the gaps each contain less than 5 percent by mass of the mass of the dry composition.

31. A castable composition according to any of the preceding claims, wherein the cast product has a density that is at least 80.7% of the theoretic density.

32. A castable composition according to any of the preceding claims, wherein the cast product has a density that is at least 83.6% of the theoretic density.

33. A castable composition according to any of the preceding claims, comprising at least 95 wt % alumina.

34. A castable composition according to claim 33, wherein the cast product has a bulk density of at least 190 pounds per cubic foot as measured at 230 degrees F.

35. A castable composition according to claim 33, wherein the cast product has a bulk density of at least 195 pounds per cubic foot as measured at 230 degrees F.

36. A castable composition according to claim 33, wherein the cast product has a bulk density of at least 200 pounds per cubic foot as measured at 230 degrees F.

37. A castable composition according to claim 33, wherein the cast product has a bulk density of at least 202 pounds per cubic foot as measured at 230 degrees F.

38. A castable composition according to claim 33, wherein the cast product has a bulk density of at least 207 pounds per cubic foot as measured at 230 degrees F.

39. A castable composition according to any of claims 34-36, wherein the bulk density is measured at 1500 degrees F.

40. A cast product produced from a castable composition according to any of claims 1-39.

41. A method for producing a cast product, comprising, (a) providing a mold having a cavity which corresponds to the size and shape of the product, (b) filling the cavity with a castable composition according to any of claims 1-39, (c) optionally subjecting the castable composition of the invention to compacting and/or vibration, (d) curing the castable composition to form the cast product, and (e) separating the mold from the cast product.

42. A method for producing a cast product, comprising, (a) providing a mold having a cavity which corresponds to the size and shape of the product, (b) filling the cavity with a castable composition according to any of claims 1-39, (c) subjecting the castable composition of the invention to a compression process, (d) curing the castable composition to form the cast product, and (e) separating the mold from the cast product.

What is believed to be the best mode of the invention has been described above. However, it will be apparent to those skilled in the art that numerous variations of the type described could be made to the present invention without departing from the spirit of the invention. The scope of the present invention is defined by the broad general meaning of the terms in which the claims are expressed.

I claim:

1. A castable composition producing, when cast with a water content of 2.8 wt % or less, a cast product having a porosity equal to or less than 10 volume percent when measured after exposure to 230 degrees F., wherein the composition has a property selected from the group consisting of:
   (a) the composition contains at least four grain fractions, of which three adjacent grain fractions are separated by gaps having a particle diameter ratio of the largest particle diameter of the gap range to the smallest particle diameter of the gap range of at least the square root of two, and the three adjacent grain fractions have remaining weight percentages that are, with respect to the respective immediately larger particle size fractions and in order of decreasing particle size, smaller, larger and smaller in value;
   (b) the composition contains at least four grain fractions, of which three adjacent grain fractions are separated by gaps having a particle diameter ratio of the largest particle diameter of the gap range to the smallest particle diameter of the gap range of at least the square root of two, and the three adjacent grain fractions have remaining weight percentages that are, with respect to the respective immediately larger particle size fractions and in order of decreasing particle size, larger, smaller, and larger in value; and
   (c) the composition contains at least four grain fractions separated by gaps having a particle diameter ratio of the largest particle diameter of the gap range to the smallest particle diameter of the gap range of at least the square root of two, and the remaining weight percentages are at least 40% in each of the at least four grain fractions.

2. A castable composition according to claim 1, wherein the cast product has a property selected from the group consisting of (a) a modulus of rupture equal to or greater than 1000 pounds per square inch as measured after exposure to 230 degrees F., and (b) a cold crushing strength equal to or greater than 3000 pounds per square inch as measured after exposure to 230 degrees F.

3. A castable composition according to claim 1, having a porosity equal to or less than 15 volume percent after exposure to 1500 degrees F.

4. A castable composition according to claim 1, producing, when cast with a water content of 2.8 wt % or less, a cast product having a modulus of rupture equal to or greater than 1000 pounds per square inch after exposure to 1500 degrees F.

5. A castable composition according to claim 1, producing, when cast with a water content of 2.8 wt % or less, a cast product having a cold crushing strength equal to or greater than 3000 pounds per square inch after exposure to 1500 degrees F.

6. A castable composition according to claim 1, comprising a coarsest refractory grain fraction comprising at least 50% by weight of the dry composition, and wherein the coarsest refractory grain fraction is separated from a smaller grain fraction by a gap having a ratio of largest particle diameter of the gap range to smallest particle diameter of the gap range being at least the square root of 2.

7. A castable composition according to claim 1, in which the composition contains at least four grain fractions, of which three adjacent grain fractions are separated by gaps having a particle diameter ratio of the largest particle diameter of the gap range to the smallest particle diameter of the gap range of at least the square root of two, and the three adjacent grain fractions have remaining weight percentages that are, with respect to the respective immediately larger particle size fractions and in order of decreasing particle size, smaller, larger and smaller in value.

8. A castable composition according to claim 1, in which the composition contains at least four grain fractions, of which three adjacent grain fractions are separated by gaps having a particle diameter ratio of the largest particle diameter of the gap range to the smallest particle diameter of the gap range of at least the square root of two, and the three adjacent grain fractions have remaining weight percentages that are, with respect to the respective immediately larger particle size fractions and in order of decreasing particle size, larger, smaller, and larger in value.

9. A castable composition according to claim 1, wherein the composition contains at least two grain fractions separated by gaps having a particle diameter ratio of the largest particle diameter of the gap range to the smallest particle diameter of the gap range of at least the square root of two, and the at least two grain fractions are entirely composed of particles with diameters less than 100 micrometers.

10. A castable composition according to claim 1, wherein the composition contains at least three grain fractions separated by gaps having a particle diameter ratio of the largest particle diameter of the gap range to the smallest particle diameter of the gap range of at least the square root of two, and the at least three grain fractions are entirely composed of particles with diameters less than 100 micrometers.

11. A castable composition according to claim 1, wherein the composition contains at least four grain fractions separated by gaps having a particle diameter ratio of the largest particle diameter of the gap range to the smallest particle diameter of the gap range of at least the square root of two, and the remaining weight percentages are at least 40% in each of the at least four grain fractions.

12. A castable composition according to claim 1, wherein the composition contains at least five grain fractions separated by gaps having a particle diameter ratio of the largest particle diameter of the gap range to the smallest particle diameter of the gap range of at least the square root of two.

13. A castable composition according to claim 7, wherein at least two of the gaps each contain less than 10 percent by mass of the mass of the dry composition.

14. A castable composition according to claim 1, wherein the cast product has a density that is at least 80.7% of the theoretic density.

15. A castable composition according to claim 1, wherein the cast product has a density that is at least 83.6% of the theoretic density.

16. A castable composition according to claim 1, comprising at least 95 wt % alumina.

17. A castable composition according to claim 16, wherein the cast product has a bulk density of at least 190 pounds per cubic foot after exposure to 230 degrees F.

18. A castable composition according to claim 16, wherein the cast product has a bulk density of at least 195 pounds per cubic foot after exposure to 230 degrees F.

19. A method for producing a cast product, comprising, (a) providing a mold having a cavity which corresponds to the size and shape of the product, (b) filling the cavity with a castable composition according to claim 1, (c) optionally subjecting the castable composition of the invention to compacting and/or vibration, (d) curing the castable composition to form the cast product, and (e) separating the mold from the cast product.

20. A method for producing a cast product, comprising, (a) providing a mold having a cavity which corresponds to the size and shape of the product, (b) filling the cavity with a castable composition according to claim 1, (c) subjecting the castable composition of the invention to a compression process, (d) curing the castable composition to form the cast product, and (e) separating the mold from the cast product.

* * * * *